June 10, 1952  M. D. WALKLET  2,600,033

TOY WHEEL AND METHOD OF MAKING

Filed April 13, 1948

Inventor
MERCER D. WALKLET

Attorneys

Patented June 10, 1952

2,600,033

UNITED STATES PATENT OFFICE 2,600,033

TOY WHEEL AND METHOD OF MAKING

Mercer D. Walklet, Akron, Ohio, assignor to The Hamlin Metal Products Company, Akron, Ohio, a corporation of Ohio Application April 13, 1948, Serial No. 20,811

3 Claims. (Cl. 152—345)

The present invention relates to a new and improved construction for a tired wheel, and, in particular, to a wheel in miniature adapted for employment on toy vehicles. In the wheels for this purpose a solid rubber tire is usually cemented in a depressed channel formed on the periphery of a disk wheel. This type of wheel has certain disadvantages which it is the purpose of the present invention to overcome. One objection to the old-type wheel is the expense, due to the fact that a full, round rubber tire is employed, and another objection is the fact that in service the rubber tire frequently becomes detached from its seat on the wheel.

With the construction shown and described herein the cost of the wheel is substantially reduced because the wheel employs much less rubber without sacrifice to the cushioning effect of the tire. While the saving in rubber in a single wheel may not be impressive, yet the production of these is very heavy and, as the vehicles or toys are usually sold at relatively close margins, the improved wheel constitutes a substantial saving in production and assembly. Furthermore, the tire is structurally anchored on the wheel and cannot be removed short of destruction of the tire.

While the invention is intended primarily for use on toy vehicles, the construction may also be adapted for larger scale use.

It is therefore among the objects of this invention to provide a tired wheel which is easy and economical of assembly, in which the tire is anchored with greater certainty than heretofore, and in which the amount of tire material is reduced without sacrifice to appearance or utility. A further object is to provide wheels of this type which possess a pneumatic cushioning feature. A still further object of the invention is to construct such a tired wheel by an improved method.

To these and other ends which will become manifest as the description proceeds, the invention will be made clear in the accompanying specification taken in conjunction with the drawing in which like numerals represent like parts throughout the several views and in which.

Figure 1:
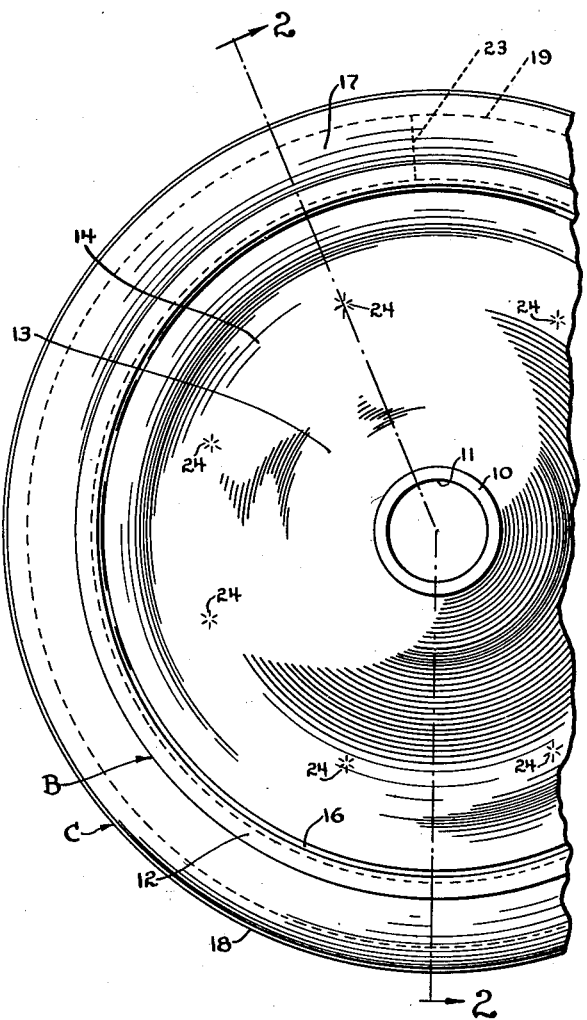
Fig. 1 is a partial side elevation of a wheel according to the invention.

Referring to the drawings, there is shown a wheel comprising two disk-like components, A and B. Since these are identical in the sense of being a mirror image, each of the other, only one need be described in detail. They comprise a planar hub portion 10 having an opening 11 for reception of an axle. From the periphery of the planar portion, the hub 10 connects with the rim 12 through an annularly recessed region comprising a long, inwardly slanted area 13, a smoothly rounded trough 14 of relatively small radius of curvature, an outward curve 15 generally resembling one-half of a U, and an outwardly extending shelf or bead support 16. The latter is inclined upwardly and outwardly in an angle of about 5° to the axis of the wheel for a purpose to be disclosed later herein. In the illustration, this angle has been indicated in excess of 5° to render the construction apparent on inspection of the drawing.

The tire unit comprises a sub-assembly shown generally at C, and has a rubber tire component 17 with tread portion 18 and an inner metallic sleeve 19 nested with the inner surface of the tire. The tire component has sidewalls which are fore-shortened radially in comparison to a conventional, inner tube-bearing tire, and have inwardly, upwardly and thence outwardly hooked portions on their inner peripheries, as shown at 20, to provide a bead with a re-entrant angle. The inner peripheral edges 22 of the metallic sleeve, which are flanged inwardly, as at 21, are received in the annular pocket behind the bead. The flanged portion 21 obviates contact of sharp portions of metal on the rubber in the direction of the main loading.

The inner sleeve 19 is preferably formed into a ring from a linear strip prior to insertion in the tire, in which case it will be joined along a lateral line, as at 23, by welding. However, the sleeve may also be fabricated by stamping flat-band annuli cut from tubular stock, or it may comprise a split annuli with mechanical locking features engageable after insertion in the tire. However, with a pre-fixed ring, the tire is easily slipped thereover and the ring easily engaged by the bead with a result that is highly satisfactory regarding permanence.

Having assembled the tire component C, it is only necessary to bring together the wheel components A and B on a line, axially of the tire until they abut along the circular line of the trough 14, whereupon they are fastened together as by spot welds 24.

In the process of bringing the wheel sections together, the slanted shelf 16 applies a wedging action to the underside of the bead, thus securely locking it in place and ensuring that it will not be dislodged by rough usage, deliberate tampering or purely natural causes.

The wheel components preferably will be provided with stamped rib portions which add to the over-all rigidity and minimize bending and other distortion, while contributing in great measure to the general decorative effect.

The invention provides a wheel in which the total amount of materials employed is minimized while maintaining the strength, functioning details and general appearance thereof, and a wheel which has qualities of permanence in a field noted for destructive tendencies. While employing a tire which is approximately half the size of a tire of conventional shape, the outward appearance when mounted is not greatly different from the standard variety and the tire is securely locked in place on a conventional rim without the assistance of an inflated inner tube, and the mounting is easily effected without undue labor or punishment of the materials. Also, in the case where a tire is wrapped around the rim and joined by its ends, the abutted join is reenforced.

Figure 3:
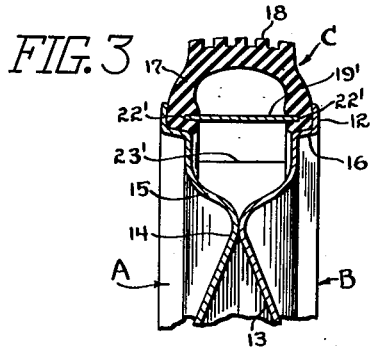
Fig. 3 is a fragmentary view showing a modification.

In Fig. 3 there is shown a modification wherein the inner band 19' is flat and extends directly from the pocket 22' in one inner peripheral margin of the tire to the pocket in the opposite inner margin. The band is shown as joined on the line 23'. This modification presents at least two distinct advantages: first, it is saving of material and of manufacturing steps in the band member, and second, it provides a trapped-air space between the band and the tire which endows the tire with the familiar pneumatic feel and further affords utilitarian features by minimizing shocks to the framework of a vehicle regardless of the scale of its construction.

While the air in the pocket may be completely trapped as in the case where a rubber cement, for instance, is employed in the pocket, this feature is not needed in all cases, for under light loads the natural rigidity of the tire will sustain its shape, and under sudden shocks the mere structure of a band received in pockets in the tire will maintain the cushion for the necessary time interval by dash-pot action.

Figure 2:
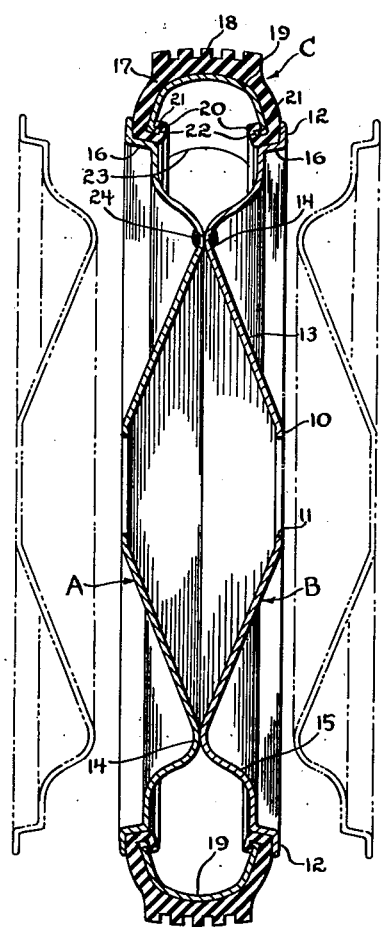
Fig. 2 is a section taken on the line 2—2 of Fig. 1, with a stage of pre-assembly indicated in phantom lines.

The invention contemplates all ranges of the trapped air space defined by positions of the band, of which Figs. 2 and 3 are illustrative. In particular, if the band lies intermediate the positions of Figs. 2 and 3, the result will be to reenforce the tire and still afford an air cushion with all advantages incident to each.

The tire may be formed from a straight extruded strip, or it may be molded in final form. In the former case, if an inner band approaching the form of Fig. 2 is employed, sealing of the tire ends is not a matter of great importance because of the locking features of the structure itself. Likewise, and for the same reason, it is not even necessary that the inner band be sealed along its abutting edges in the case of either modification. However, in the case of Fig. 3, if a split tire is used, a good seal therefor would be desirable.

While emphasis has been placed upon the use of the invention as a small scale structure because of the many advantages apertaining to such use, it may be employed to advantage in larger scale structures.

Having thus described my invention, I wish it to be understood that the particular embodiment shown is offered by way of illustration primarily, and that the invention is not to be considered as limited except insofar as shall appear from the spirit and scope of the appended claims.

What is claimed is:

1. A tired wheel comprising a wheel proper with inner and outer disks joined together and curved near their peripheries to form an annular channel of U-shaped section when joined, annular flanges at the peripheral edges of said channel slanted radially outwardly in directions axially away from the central plane of said wheel, radial flanges at the outer peripheral edges of said slanted flanges, a tire of channel section inverted with respect to said annular channel on said wheel proper and having beads dwelling on said slanted flanges, said beads having annular slots opening inwardly of the tire and directed generally radially of the wheel, and an annular, metal member within said tire having its edges lodged in the slots in the beads, and said member being free of contact with said wheel proper.

2. A tired wheel comprising a wheel proper with inner and outer disks joined together and curved near their peripheries to form an annular channel of U-shaped section when joined, annular flanges at the peripheral edges of said channel slanted radially outwardly in directions axially away from the central plane of said wheel, radial flanges at the outer peripheral edges of said slanted flanges, a tire of channel section inverted with respect to said annular channel on said wheel proper, and having beads dwelling on said slanted flanges, said beads having annular slots opening inwardly of the tire and directed generally radially of the wheel, and an annular, metal member within said tire engaging a substantial portion of the inner wall thereof and having its edges lodged in the slots in said beads.

3. A tired wheel comprising a wheel proper with inner and outer disks joined together and curved near their peripheries to form an annular channel of U-shaped section when joined, annular flanges at the peripheral edges of said channel slanted radially outwardly in directions axially away from the central plane of said wheel, radial flanges at the outer peripheral edges of said slanted flanges, a tire of channel section inverted with respect to said annular channel on said wheel proper and having beads dwelling on said slanted flanges, said beads having annular slots opening inwardly of the tire and directed generally radially of the wheel, and an annular, metal member within said tire engaging the inner wall of the tire throughout its extent and having its edges lodged in the slots in said beads.

MERCER D. WALKLET.

REFERENCES CITED

The following references are of record in the file of this patent:

UNITED STATES PATENTS

| Number | Name | Date |
|--------|------|------|
| 528,451 | Tillinghast | Oct. 30, 1894 |
| 604,520 | Dorsey | May 24, 1898 |
| 775,824 | Keith | Nov. 22, 1904 |
| 885,062 | Lefferts | Apr. 21, 1908 |
| 1,023,454 | Black | Apr. 16, 1912 |
| 1,052,757 | Shea | Feb. 11, 1913 |
| 1,487,552 | Franz | Mar. 18, 1924 |
| 1,708,969 | Gill | Apr. 16, 1929 |
| 2,005,628 | Maranville | June 18, 1935 |
| 2,428,551 | Burger | Oct. 7, 1947 |